United States Patent [19]
Porter et al.

[11] Patent Number: 5,201,832
[45] Date of Patent: Apr. 13, 1993

[54] INTEGRATED AEROSPIKE ENGINE AND AEROBRAKE FOR A SPACECRAFT

[75] Inventors: John W. Porter, San Diego; Paul H. Sager, Jr., Rancho Santa Fe, both of Calif.

[73] Assignee: General Dynamics Corporation, Space Systems Division, San Diego, Calif.

[21] Appl. No.: 855,398

[22] Filed: Mar. 23, 1992

[51] Int. Cl.$^5$ .............................................. B64G 1/00
[52] U.S. Cl. .............................. 244/158 R; 244/164; 244/160; 244/110 D; 244/54; 244/62
[58] Field of Search ................... 244/158 R, 169, 164, 244/172, 52, 110 D, 16 D, 1 R, 110 R, 138 R, 54, 55, 62

[56] References Cited

U.S. PATENT DOCUMENTS

| | | | |
|---|---|---|---|
| 3,228,634 | 1/1966 | Chakoian | 244/160 |
| 3,604,667 | 9/1971 | Moraes | 244/160 |
| 4,832,288 | 5/1989 | Kandall | 244/160 |
| 4,896,847 | 1/1990 | Coertsch | 244/158 R |
| 5,083,728 | 1/1992 | Heck | 244/160 |
| 5,108,046 | 4/1992 | Ghaumette | 244/110 D |

*Primary Examiner*—Galen Barefoot
*Assistant Examiner*—Christopher P. Ellis
*Attorney, Agent, or Firm*—John R. Duncan; Frank D. Gilliam

[57] ABSTRACT

The purpose integrated aerospike rocket engine and space vehicle aerobrake is to provide for optimum installation and performance of these systems in a space vehicle. By integrating the aerospike engine into the middle of the aerobrake, the engine can be located with its center of gravity toward the face of the aerobrake. This location permits the maximization of the displacement of the aerodynamic center of pressure of the aerobrake relative to the center of gravity of the space vehicle, thereby maximizing the stability of the vehicle upon aerodynamic capture at the earth or another planet. By substituting an aerospike rocket engine for a conventional bell nozzle engine, the doors required to close the aperture in the aerobrake to accommodate the conventional engines can be eliminated. In addition to the unique combination of the aero-spike engine and the aerobrake, an included unique feature of the invention is the extendable nozzle plug. By extending the plug, the annular combustion nozzle of the aerospike engine is closed, thereby, eliminating the lip which would otherwise extend into the airstream and present extreme heating problems.

6 Claims, 2 Drawing Sheets

INTEGRATED AEROSPIKE ENGINE AND AEROBRAKE FOR A SPACECRAFT

BACKGROUND OF THE INVENTION

The invention relates to space vehicles and more specifically to a space vehicle having an aerospike rocket engine and a space vehicle aerobrake integrated into its structure.

One of the problems with existing designs of space vehicles that utilize an aerobrake and bell nozzle rocket engines will now be discussed. An aerobrake is a large umbrella-like structure which is mounted forward of a space vehicle. Its purpose is to create atmospheric drag on a vehicle to reduce its speed instead of firing a rocket to obtain retrothrust. For various design considerations, space vehicles usually mount the aerobrake aft of the main rocket engines. This necessitates one or more door mechanisms in the aerobrake and requires engine extensions to allow engine operation. The doors must close and seal to a smooth surface to avoid localized aerodynamic heating problems and heat damage to equipment and propellant tanks behind the aerobrake. If a door fails to close, airstream leaks could cause components behind the aerobrake to be heated above 5500 degrees fahrenheit. Penetrating airstream forces could also cause the space vehicle to become unstable and fail to capture, or crash. The door size becomes a compromise between engine gimballing allowance and brake structural integrity. For these reasons, doors increase design complexity and risk.

It is an object of the invention to provide an improved spacecraft with an aerospike engine that forms the central element of the aerobrake.

It is also an object of the invention to provide an improved integrated aerospike engine and aerobrake that eliminates the necessity for one or more door mechanisms in the prior art spacecraft that has the rocket engines extending from the center of the aerobrake.

It is another object of the invention to provide a novel integrated aerospike engine and aerobrake in a spacecraft that allows more propellant or longer payloads to be carried when the vehicle is being boosted to a space launch point.

SUMMARY OF THE INVENTION

The novel integrated aerospike engine and aerobrake that have been combined in a space vehicle should provide design simplification and reduce risk in the operation of space vehicles.

The aerospike engine is installed in the middle of the aerobrake. The aerospike rocket engine includes an annular combustion chamber surrounding a blunt, conic plume deflector, called an aerospike or plug. For engine operation, the plug is retracted and the annular combustion chamber nozzle is exposed to permit the exhaust from the combustion chamber to expand along the surface of the aerospike, providing thrust to the vehicle. When extended, the plug closes the annular nozzle exit and the aerospike forms the central element of the aerobrake. In this position, the smooth stable entry body geometry is provided for aerobraking. If the plug fails to extend, the engine may be damaged, but no aerodynamic leakage is possible, and stability is maintained. Additionally, the arrangement is more compact than an aerobrake plus traditional bell nozzle rocket engines and doors. This allows more propellant or longer payloads to be carried when the vehicle is being boosted to a space launch point. The plug retraction mechanism could be an electrically powered ball screw or similar drive centrally mounted with the drive ball nut fixed to the frame attached to the aerobrake structure. Guides would be provided at the perimeter of the plug so as to maintain the plug nozzle on center. If necessary, liquid oxygen coolant is circulated through the aerospike nose surface and through the leading edge at the gap between the retractable center plug and the aerodynamic surface. The circulation is a normal part of the engine operation, but instead of supporting combustion, this coolant is exhausted into the atmospheric stream during atmosphere entry to mitigate the cooling problem on the aerobrake center.

With the integrated arrangement, the aerospike engine is operated to provide thrust when departing from a planetary or lunar orbit and for braking at destinations with no atmosphere (e.g. propulsive capture in lunar orbit). However, when the engine is not operating, the center aerospike, or plug, are extended, and the combustion chamber(s) are sealed. The engine plug thus becomes a conformal part of the aerobrake when the aerobrake is used for capture in Earth orbit or the orbit of another planet with atmosphere.

DESCRIPTION OF THE PREFERRED EMBODIMENT

Figure 1:
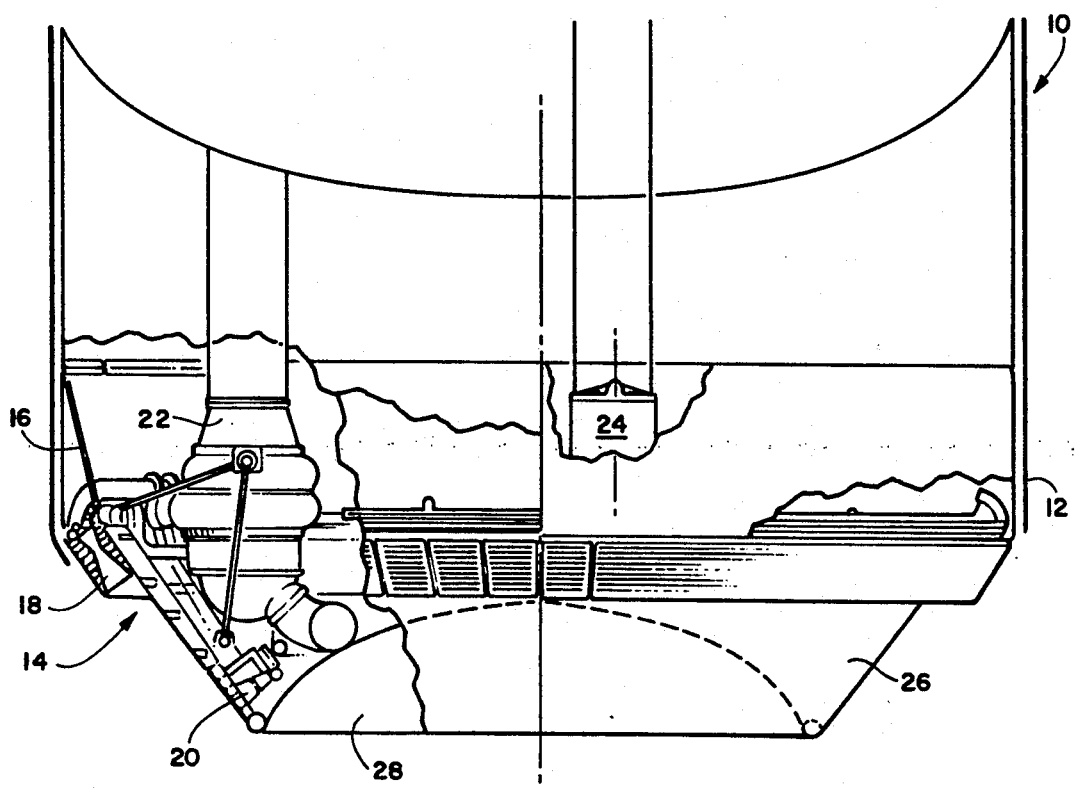
FIG. 1 is a schematic side elevational view of the propulsion section of a space vehicle having an aerospike engine.
Figure 2:
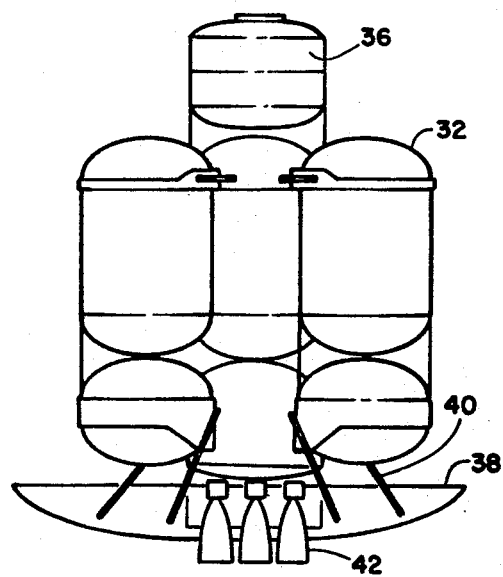
FIG. 2 is a schematic side elevation view of the present state of the art space vehicle having an aerobrake and bell nozzle rocket engines.

The background for the invention is best understood by referring to FIGS. 1 and 2 of the drawings. In FIG. 1, the aft end of a space vehicle 10 is seen having a tubular rocket housing 12. A conventional aerospike engine 14 is mounted in the bottom end of tubular housing 12 and supported therein by a plurality of struts 16. Aerospike engine 14 has an annular combustion chamber 18 and a plurality of thrust vector control combustors 20. These are connected to fuel pumps 22 and oxygen pump 24. The bottom end of aerospike engine 14 has a tubular plug 26 that extends downwardly below the bottom end of tubular housing 12 and its bottom end is closed by a base closure 28.

In FIG. 2 a spacecraft 30 has a plurality of propellant tanks 32 mounted in its tubular housing 34. A crew capsule 36 is supported on its top end and an aerobrake 38 has support struts 40 attaching it to the bottom end of tubular housing 37. A plurality of bell nozzle rocket engines 42 are secured to the bottom end of tubular housing 34.

Figure 3:
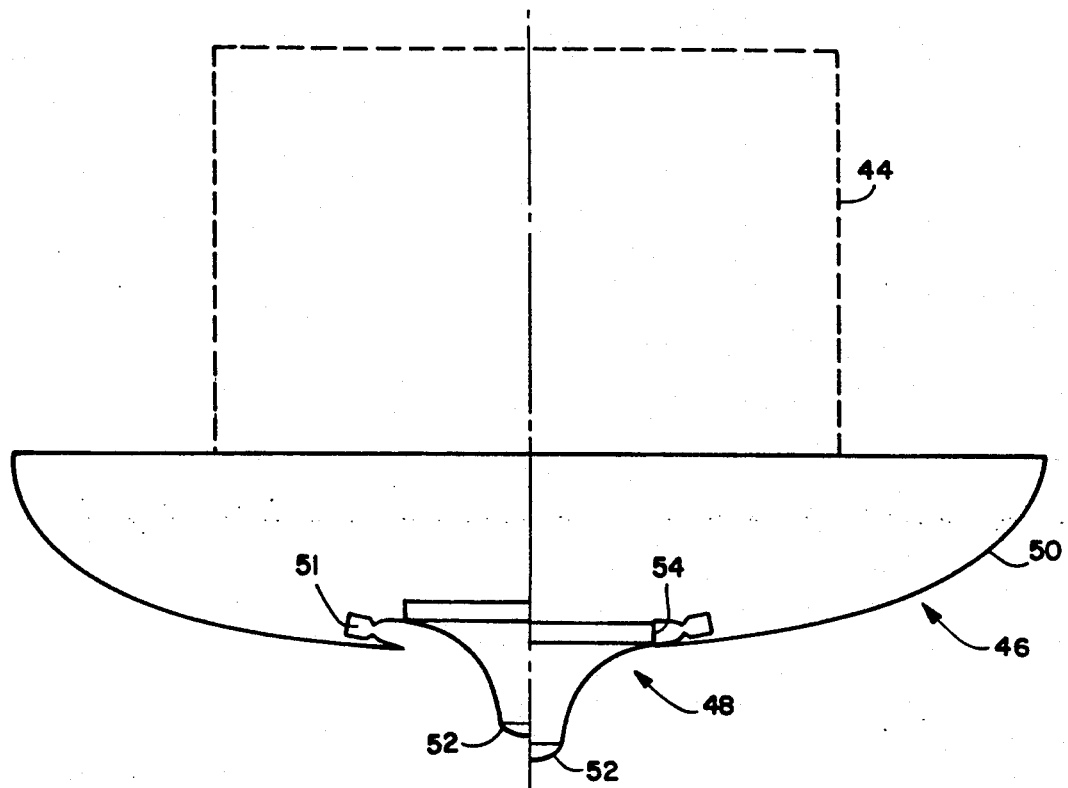
FIG. 3 is a schematic partial side elevation view of the propulsion section of a spacecraft incorporating an aerospike engine in the aerobrake.
Figure 4:
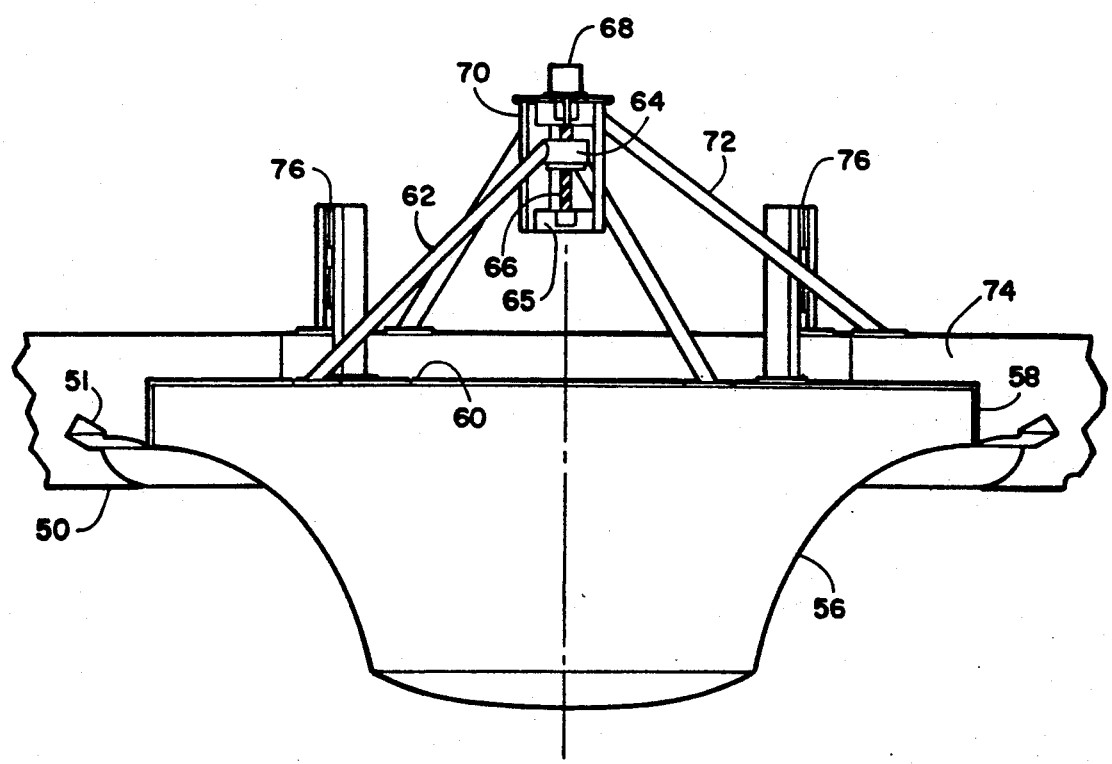
FIG. 4 is a partial schematic view illustrating the manner in which the aerospike engine is supported and attached to the aerobrake.

The novel integrated aerospike engine and aerobrake are schematically shown in FIGS. 3 and 4 in which they are secured to the bottom end of a spacecraft 44. Aerobrake 46 has the aerospike engine 48 mounted in a centrally located aperture in its convex shaped rear wall 50. Aerospike engine 48 has an annular combustion chamber 51 whose bottom end is exposed when nozzle 52 is in its retracted position. When nozzle 52 is in its extended position, the annular side wall 54 of the aerospike plug closes off the annular combustion chamber 51.

The manner in which the aerospike engine is supported within the aerobrake is best understood by referring to the schematic illustration of FIG. 4. Aerospike engine nozzle 52 has a concave bottom wall 56, an annular side wall 58 and a top wall 60. Preferably at least three support struts 62 have their bottom ends attached to top wall 60 and their top ends attached to nut 64 that is free to travel upwardly and downwardly on ball screw 66. Ball screw 66 may be driven by an electric motor 68 that is supported in ball screw frame 70. At least three drive support struts 72 have their top ends secured to ball screw frame 70 and their bottom ends secured to stationary frame 74 of aerobrake 46. At least three ball slide guides 76 have their one side connected to stationary frame 74 and their other side and associated structure connected to top wall 60 to insure that aerospike engine plug 52 is properly aligned throughout its retracted and extended travel.

What is claimed is:

1. An integrated aerospike engine and aerobrake for a spacecraft comprising:
    a spacecraft having propellant tanks that have a front end and a rear end;
    an aerobrake having a front end that is connected to the rear end of said spacecraft, said aerobrake having a convex shaped rear wall with a centrally located aperture of a predetermined size;
    an aerospike engine having an outwardly extending engine plug, a front wall and a rear wall, and an annular combustion chamber, said aerospike engine being mounted in the centrally located aperture in the rear wall of said aerobrake; and means for axially moving the engine plug of said aerospike engine between a retracted position and an extended position, in said retracted position the annular combustion chamber of said aerospike engine is exposed to and in communication with the centrally located aperture in the rear wall of said aerobrake, in said extended position the annular combustion chamber of said aerospike engine mates flush with the rear wall of said aerobrake.

2. An integrated aerospike engine and aerobrake for a spacecraft as recited in claim 1 wherein the rear of said aerospike engine has a bottom wall whose perimeter shape conforms to the shape of the centrally located aperture in the rear wall of said aerobrake to give it aerodynamic properties.

3. An integrated aerospike engine and aerobrake for a spacecraft as recited in claim 2 wherein the aperture in the rear wall of said aerobrake has a circular configuration.

4. In integrated aerospike engine and aerobrake for a spacecraft as recited in claim 2 further comprising guide means for properly aligning the engine plug of said aerospike engine as it is moved between its retracted and extended positions.

5. An integrated aerospike engine and aerobrake for a spacecraft as recited in claim 1 wherein said means for axially moving the rear wall of said aerospike engine between its retracted and extended positions comprises a drive motor connected to a ball screw that is connected to a ball drive nut mounted in a ball screw frame.

6. An integrated aerospike engine and aerobrake for a spacecraft as recited in claim 5 further comprising means for securing said ball screw to a stationary frame of said aerobrake.

* * * * *